(12) United States Patent
Nardella, Sr.

(10) Patent No.: US 11,643,025 B2
(45) Date of Patent: May 9, 2023

(54) TAIL GATE PROTECTOR

(71) Applicant: MPA INDUSTRIES PTY LTD, Rosebud (AU)

(72) Inventor: Paul Nardella, Sr., Rosebud (AU)

(73) Assignee: MPA INDUSTRIES PTY LTD, Victoria (AU)

( * ) Notice: Subject to any disclaimer, the term of this patent is extended or adjusted under 35 U.S.C. 154(b) by 0 days.

(21) Appl. No.: 16/336,699

(22) PCT Filed: Dec. 14, 2018

(86) PCT No.: PCT/AU2018/000262
§ 371 (c)(1),
(2) Date: Mar. 26, 2019

(87) PCT Pub. No.: WO2019/232565
PCT Pub. Date: Dec. 12, 2019

(65) Prior Publication Data
US 2021/0197735 A1    Jul. 1, 2021

(30) Foreign Application Priority Data

Jun. 6, 2018 (AU) ................. 2018902028

(51) Int. Cl.
*B60R 13/01*    (2006.01)
*B32B 5/02*     (2006.01)
(Continued)

(52) U.S. Cl.
CPC ............ *B60R 13/01* (2013.01); *B32B 5/022* (2013.01); *B32B 5/26* (2013.01); *B32B 7/12* (2013.01);
(Continued)

(58) Field of Classification Search
CPC .......... B60R 13/01; B32B 5/022; B32B 5/26; B32B 7/12; B32B 27/12; B32B 37/12;
(Continued)

(56) References Cited

U.S. PATENT DOCUMENTS 5,666,772 A * 9/1997 Betty ..................... E04D 11/00
                                                      52/177
5,806,909 A * 9/1998 Wise ...................... B60R 13/01
                                                      296/39.1
(Continued)

FOREIGN PATENT DOCUMENTS

WO      2008070064 A2    6/2008

OTHER PUBLICATIONS

PolymerDatabase.com, HDPE, https://web.archive.org/web/20160329172812/https://polymerdatabase.com/Commecial%20Polymers/HDPE.html (Year: 2016).*
(Continued)

*Primary Examiner* — Michael Zhang
(74) *Attorney, Agent, or Firm* — McKee, Voorhees & Sease, PLC

(57) ABSTRACT

The present disclosure is directed to a tailgate protector for a vehicle, wherein the protector comprises a pressure absorbent material which has been attached to a body of the protector with an adhesive, wherein the material having pressure absorbent property is a fabric or rubber and provides a soft padded area for protecting a user from injury or discomfort, and the adhesive is a pressure sensitive adhesive comprising styrene, and the body is formed from a resin.

19 Claims, 3 Drawing Sheets

(51) Int. Cl.
   *B32B 5/26* (2006.01)
   *B32B 7/12* (2006.01)
   *B32B 27/12* (2006.01)
   *B32B 37/12* (2006.01)
   *B62D 27/02* (2006.01)
   *B62D 29/04* (2006.01)
   *B62D 33/023* (2006.01)
   *B62D 65/16* (2006.01)
   *C09J 153/02* (2006.01)

(52) U.S. Cl.
   CPC .............. *B32B 27/12* (2013.01); *B32B 37/12* (2013.01); *B62D 27/02* (2013.01); *B62D 29/041* (2013.01); *B62D 29/048* (2013.01); *B62D 33/023* (2013.01); *B62D 65/16* (2013.01); *C09J 153/02* (2013.01); *B32B 2262/0253* (2013.01); *B32B 2262/0276* (2013.01); *B32B 2307/402* (2013.01); *B32B 2307/536* (2013.01); *B32B 2307/558* (2013.01); *B32B 2307/718* (2013.01); *B32B 2307/744* (2013.01); *B32B 2605/00* (2013.01)

(58) Field of Classification Search
   CPC .... B32B 2262/0253; B32B 2262/0276; B32B 2307/402; B32B 2307/536; B32B 2307/558; B32B 2307/718; B32B 2307/744; B32B 2605/00; B62D 27/02; B62D 29/041; B62D 29/048; B62D 33/023; B62D 65/16; C09J 153/02
   See application file for complete search history.

(56) References Cited

U.S. PATENT DOCUMENTS

| | | | | |
|---|---|---|---|---|
| 6,221,925 | B1* | 4/2001 | Constant | C08J 9/00 |
| | | | | 521/149 |
| 6,431,629 | B1* | 8/2002 | Emery | B60R 13/01 |
| | | | | 296/39.2 |
| 7,442,739 | B1* | 10/2008 | Hatfield | C09J 153/02 |
| | | | | 524/474 |
| 2005/0088014 | A1 | 4/2005 | Woodson et al. | |
| 2007/0298215 | A1 | 12/2007 | Nicolai et al. | |
| 2008/0084083 | A1* | 4/2008 | Boddie | B60R 13/01 |
| | | | | 296/39.1 |
| 2008/0277959 | A1* | 11/2008 | Boddie | B60R 11/00 |
| | | | | 296/39.2 |
| 2017/0050408 | A1 | 2/2017 | Park et al. | |
| 2017/0348951 | A1 | 12/2017 | Curfman et al. | |
| 2019/0270397 | A1* | 9/2019 | Owens | B32B 3/02 |

OTHER PUBLICATIONS

Omnexus, Shore D Hardness Test, https://omnexus.specialchem.com/polymer-properties/properties/hardness-shore-d (Year: 2021).*
Sourcefloor, Backings: The Flip Side of Matting, https://www.sourcefloor.com/backings-the-flip-side-of-matting/ (Year: 2014).*
Technical Datasheet of MARLEX HXM 50100 (Year: 2014).*

* cited by examiner

TAIL GATE PROTECTOR

FIELD OF THE INVENTION

The present invention relates to a cargo area protector. In particular, the present invention relates to a tailgate protector for a vehicle.

BACKGROUND TO THE INVENTION

The cargo area body of a pickup, tray back and other utility vehicles is located behind the cab and its cargo area is often protected by a protector, such as a liner, to prevent direct contact of foreign materials such as dirt, chemicals, abrasives and the like that may promote scratching and rusting of its surface.

A tailgate door is a door located at the rear of a pickup, tray back and other utility vehicles to provide rear access to its cargo area. A tailgate door is moveable between an open position and a closed position. In a closed position, the tailgate door is in an upright position and the cargo area is surrounded by an upright tailgate door and cargo area side walls to contain cargo within the cargo area. In an open position, the tailgate door may be in a substantially horizontal position and the cargo area is surrounded by cargo area side walls and the tailgate door, but the tailgate door being laid substantially flat. When the tailgate door is in a substantially horizontal position, it creates an opening into the cargo area to promote rear access. When the tailgate door is in an upright position it covers the opening. The tailgate door may also be protected by a protector to prevent direct contact of foreign materials such as dirt, chemicals, abrasives and the like that may promote scratching and rusting of its surface.

Currently available protectors and liners for cargo area surfaces are made from hard polymeric materials, often with uneven or non-uniform surfaces to provide a non-slip, frictional surface. A non-slip, frictional surface assists in securing cargo within the cargo area during transit. Such protectors and liners may be affixed to surfaces of the cargo area to protect the surfaces from damage.

To combat a surface made from a hard polymeric material, some users simply place a strip of carpet over the polymeric material, or bolt a strip of carpet to the polymeric material, or lay cushions over the polymeric material.

The present invention seeks to provide an improved protector for a cargo area.

SUMMARY OF THE INVENTION

In accordance with one embodiment of the present invention, a protector with a pressure absorbent property attached to the protector, is provided. The protector may be a tailgate protector. The protector with a pressure absorbent property offers comfort to a user accessing a cargo area of a vehicle, or otherwise using a tailgate door to access the cargo area. The protector comprises a pressure absorbent material that can be compressed. The protector comprises a body to support a weight-bearing load. Advantageously, the protector is an all-in-one protector where the pressure absorbent material prevents injury or discomfort to a user.

A protector for a cargo area of a vehicle may be advantageous because it could prevent damage from direct contact of foreign materials to a cargo area surface as well as from loading and unloading of cargo into or out of the vehicle. In some situations, when a tailgate door is positioned in its opened position, the tailgate door may be used as a table, a seat, or a platform to climb into or out of the cargo area.

In a first aspect, the present invention provides a cargo area protector for a vehicle, wherein the protector comprises a pressure absorbent material which has been chemically or thermally attached to a body of the protector.

In a second aspect, the present invention provides a cargo area protector for use in preventing injury or discomfort, wherein the protector comprises a pressure absorbent material which has been chemically or thermally attached to a body of the protector.

In a third aspect, the present invention provides a tailgate protector comprising a pressure absorbent material which has been chemically or thermally attached to a body of the protector.

In one embodiment of the third aspect, the present invention provides a tailgate protector for a vehicle, wherein the protector comprises a pressure absorbent material which has been attached to a body of the protector with an adhesive, wherein the material having pressure absorbent property is a fabric or rubber and provides a soft padded area for protecting a user from injury or discomfort, and the adhesive is a pressure sensitive adhesive comprising styrene, and the body is formed from a resin.

In another embodiment of the third aspect, the present invention provides a tailgate protector for a vehicle, wherein the protector consists essentially of a pressure absorbent material which has been attached to a body of the protector with an adhesive, wherein the material having pressure absorbent property is a fabric or rubber and provides a soft padded area for protecting a user from injury or discomfort, and the adhesive is a pressure sensitive adhesive comprising styrene, and the body is formed from a resin.

In a fourth aspect, the present invention provides a tailgate assembly comprising a tailgate door and a tailgate protector comprising a pressure absorbent material which has been chemically or thermally attached to a body of the protector.

In one embodiment of the fourth aspect, the present invention provides a tailgate assembly for a vehicle, wherein the tailgate assembly comprises a tailgate door and a tailgate protector comprising a pressure absorbent material which has been attached to a body of the protector with an adhesive, wherein the material having pressure absorbent property is a fabric or rubber and provides a soft padded area for protecting a user from injury or discomfort, and the adhesive is a pressure sensitive adhesive comprising styrene, and the body is formed from a resin.

In another embodiment of the fourth aspect, the present invention provides a tailgate assembly for a vehicle, wherein the tailgate assembly comprises a tailgate door and a tailgate protector consisting essentially of a pressure absorbent material which has been attached to a body of the protector with an adhesive, wherein the material having pressure absorbent property is a fabric or rubber and provides a soft padded area for protecting a user from injury or discomfort, and the adhesive is a pressure sensitive adhesive comprising styrene, and the body is formed from a resin.

In a fifth aspect, the present invention provides a cargo bed protector for a vehicle comprising a pressure absorbent material which has been chemically or thermally attached to a body of the protector.

In a sixth aspect, the present invention provides a body for use in making a cargo area protector or a tailgate protector, wherein the body has a surface adapted to chemically or thermally attach a pressure absorbent material to the body of the protector.

In a seventh aspect, the present invention provides a pressure absorbent material for use in making a cargo area protector or a tailgate protector, wherein the pressure absorbent material has a surface adapted to chemically or thermally attach to a body of the protector.

In an eighth aspect, the present invention provides a method of making a cargo area protector or a tailgate protector for use in a vehicle, the method comprising chemically or thermally attaching a pressure absorbent material to a body of the protector, and wherein the cargo area protector is a tailgate protector.

In one embodiment of the eighth aspect, the present invention provides a method of making a tailgate protector for use in a vehicle, the method comprising attaching a pressure absorbent material to a body of the protector with an adhesive, wherein the material having pressure absorbent property is a fabric or rubber and provides a soft padded area for protecting a user from injury or discomfort, and the adhesive is a pressure sensitive adhesive comprising styrene, and the body is formed from a resin.

In one embodiment of the eighth aspect, the method further comprises forming the body by injection moulding, blow-moulding or thermoforming application.

In one embodiment of the eighth aspect, the method of chemically or thermally attaching the pressure absorbent material to the body is selected from any one of hot melt application, extrusion, slot nozzle, roller or spray application, optionally at a temperature of about 150 to about 180° C.

In a ninth aspect, the present invention provides a method of fitting or retrofitting a cargo area protector of the first or second aspect, or a tailgate protector of the third aspect, or a tailgate assembly of the fourth aspect, or a cargo bed of the fifth aspect, comprising fitting to a vehicle.

In a tenth aspect, the present invention provides a tailgate protector for use in a vehicle, wherein the protector consists essentially of: a facing layer of pressure absorbent material having a Shore A hardness of less than 50 as measured according to ASTM D2240; an intermediate layer of adhesive material comprising one or more thermoplastics; and a body layer formed of resin; wherein the layer of adhesive is disposed between the pressure absorbent material and the body layer, and wherein the pressure absorbent material is adhered to the body layer with an adhesive strength of at least about 200 psi.

In an eleventh aspect, the present invention provides a tailgate protector consisting essentially of: a first layer of pressure absorbent material; a second layer of a body formed of resin; and an adhesive material; wherein the pressure absorbent material is a facing layer comprising a facing side and a non-facing side located at opposite faces of the pressure absorbent material, and wherein the adhesive material is disposed between the pressure absorbent material and the body to adhesively attach the non-facing side to the body, and wherein the pressure absorbent material has a Shore A hardness of less than 50 and the body has a Shore A hardness of greater than 50, as measured according to ASTM D2240.

In one embodiment of any of the above aspects, the tailgate protector is removably attachable to an internal wall of a tailgate door.

In one embodiment of any of the above aspects, the pressure absorbent material is an outward facing external layer.

In one embodiment of any of the above aspects, the pressure absorbent material has: (i) a Shore A hardness of less than 50 as measured according to ASTM D2240 type A scale; or (ii) a Shore OO hardness of less than 85 as measured according to ASTM D2240 type OO scale.

In one embodiment of any of the above aspects, the pressure absorbent material provides a cushioning effect and/or a non-slip surface. Optionally, the pressure absorbent material is a waterproof and/or weather resistant material.

In another embodiment of any of the above aspects, the pressure absorbent material provides a soft padded area for protecting a user, such as the user's knee or leg from injury. A cushioning effect produced by the pressure absorbent material chemically or thermally attached to the body ensures that a user's body part coming in contact to it can be sufficiently prevented from discomfort and/or injury.

In another embodiment of any of the above aspects, the pressure absorbent material may be a single unit, or formed from two, three, four, five or more pressure absorbent material units.

In another embodiment of any of the above aspects, the pressure absorbent material is a soft material selected from one or more of foam, carpet, felt, synthetic fabrics, wool, and polymeric material including rubber. Preferably, the material is one or more fabric selected from waterproof synthetic fabric, polyester fabric, polyester rubber fabric, and polyalkylene fabric including polyethylene fabric and polypropylene fabric, nylon fabric, bulked continuous filament nylon (BCF nylon) fabric, vinyl fabric, and rubber fabric. In certain embodiments of any of the above aspects, a polymeric material having a Shore A hardness of less than 50, as measured according to ASTM D2240 type A scale may be used, or a polymeric material having a Shore OO hardness of less than 85, as measured according to ASTM D2240 type OO scale may be used.

In another embodiment of any of the above aspects, the pressure absorbent material is a polyester non-woven fabric, optionally 100% polyester non-woven carpet.

In another embodiment of any of the above aspects, the pressure absorbent material is a polypropylene non-woven fabric, optionally 100% polypropylene non-woven carpet.

In another embodiment of any of the above aspects, the pressure absorbent material is rubber or marine carpet.

In another embodiment of any of the above aspects, the pressure absorbent material is free from polyurea, polyurethane or aliphatic/aromatic isocyanate monomers.

In another embodiment of any of the above aspects, the pressure absorbent material has a latex backing.

In another embodiment of any of the above aspects, the pressure absorbent material has a nominal mass per unit area/density range of about 300 $g/m^2$ to about 1550 $g/m^2$, 500 $g/m^2$ to about 1200 $g/m^2$, 800 $g/m^2$ to about 1200 $g/m^2$, or 1000 $g/m^2$ to about 1200 $g/m^2$. In another embodiment, the nominal mass per unit area/density is about 300 $g/m^2$, 350 $g/m^2$, about 400 $g/m^2$, about 500 $g/m^2$, about 550 $g/m^2$, about 600 $g/m^2$, about 650 $g/m^2$, about 700 $g/m^2$, about 750 $g/m^2$, about 800 $g/m^2$, about 850 $g/m^2$, about 900 $g/m^2$, about 950 $g/m^2$, about 1000 $g/m^2$, about 1050 $g/m^2$, about 1100 $g/m^2$, about 1150 $g/m^2$, about 1200 $g/m^2$, about 1250 $g/m^2$, about 1300 $g/m^2$, about 1350 $g/m^2$, about 1400 $g/m^2$, about 1450 $g/m^2$, about 1500 $g/m^2$, or about 1550 $g/m^2$.

In another embodiment of any of the above aspects, the pressure absorbent material may have a maximum thickness range from about 1 mm to 20 mm, about 5 mm to about 20 mm, about 5 mm to about 10 mm, about 5 mm to about 15 mm, about 10 mm to about 15 mm, about 10 mm to about 20 mm, or about 15 mm to about 20 mm. In certain embodiments, the thickness of the pressure absorbent material may be about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm.

In another embodiment of any of the above aspects, the pressure absorbent material is at least one or more of waterproof, durable, hard wearing, mildew resistant, insect resistant, stain resistant, UV stabilised, wet and dry environment safe, heat resistant, fray resistant, zipper resistant, colour fast, and low maintenance.

In another embodiment of any of the above aspects, the pressure absorbent material has a Shore A durometer hardness of less than 50, less than 45, less than 40, less than 35, less than 30, less than 25, less than 20, less than 15, less than 10, or less than 5, as measured according to ASTM D2240 type A scale. In certain embodiments, the pressure absorbent material has a Shore A durometer hardness of from 0 to about 50, from 0 to about 45, from 0 to about 40, from 0 to about 35, from 0 to about 30, from 0 to about 25, from 0 to about 20, from 0 to about 15, from 0 to about 10, or from 0 to about 5, as measured according to ASTM D2240 type A scale.

In another embodiment of any of the above aspects, the pressure absorbent material has a Shore OO durometer hardness of less than 85, less than 80, less than 75, less than 70, less than 65, less than 60, less than 55, less than 50, less than 45, less than 40. less than 35, less than 30, less than 25, less than 20, less than 15, less than 10, or less than 5, as measured according to ASTM D2240 type OO scale. In certain embodiments, the pressure absorbent material has a Shore OO durometer hardness of from 0 to about 85, from 0 to about 80, from 0 to about 75, from 0 to about 70, from 0 to about 65, from 0 to about 60, from 0 to about 55, from 0 to about 50, from 0 to about 45, from 0 to about 40, from 0 to about 35, from 0 to about 30, from 0 to about 25, from 0 to about 20, from 0 to about 15, from 0 to about 10, or from 0 to about 5, as measured according to ASTM D2240 type OO scale.

In certain embodiments, the hardness of the polyester non-woven fabric may be from 0 to about 50 Shore A, more typically from 0 to about 30 Shore A, still more typically from 0 to 20 Shore A, and even more typically from 0 to about 10 Shore A, as measured according to ASTM D2240 type A scale. In other embodiments, the hardness of the polyester non-woven fabric may be from 0 to about 50 Shore OO, more typically from 0 to about 40 Shore OO, still more typically from 0 to 30 Shore OO, and even more typically from 0 to about 20 Shore OO, as measured according to ASTM D2240 type OO scale.

In certain embodiments, the hardness of the 100% polyester non-woven carpet may be from 0 to about 50 Shore A, more typically from 0 to about 30 Shore A, still more typically from 0 to 20 Shore A, and even more typically from 0 to about 10 Shore A, as measured according to ASTM D2240 type A scale. In other embodiments, the hardness of the 100% polyester non-woven carpet may be from 0 to about 50 Shore OO, more typically from 0 to about 40 Shore OO, still more typically from 0 to 30 Shore OO, and even more typically from 0 to about 20 Shore OO, as measured according to ASTM D2240 type OO scale.

In certain embodiments, the hardness of the polypropylene non-woven fabric may be from 0 to about 50 Shore A, more typically from 0 to about 30 Shore A, still more typically from 0 to 20 Shore A, and even more typically from 0 to about 10 Shore A, as measured according to ASTM D2240 type A scale. In other embodiments, the hardness of the polypropylene non-woven fabric may be from 0 to about 50 Shore OO, more typically from 0 to about 40 Shore OO, still more typically from 0 to 30 Shore OO, and even more typically from 0 to about 20 Shore OO, as measured according to ASTM D2240 type OO scale.

In certain embodiments, the hardness of the 100% polypropylene non-woven carpet may be from 0 to about 50 Shore A, more typically from 0 to about 30 Shore A, still more typically from 0 to 20 Shore A, and even more typically from 0 to about 10 Shore A, as measured according to ASTM D2240 type A scale. In other embodiments, the hardness of the 100% polypropylene non-woven carpet may be from 0 to about 50 Shore OO, more typically from 0 to about 40 Shore OO, still more typically from 0 to 30 Shore OO, and even more typically from 0 to about 20 Shore OO, as measured according to ASTM D2240 type OO scale.

In certain embodiments, the hardness of the rubber carpet may be from 0 to about 50 Shore A, more typically from 0 to about 30 Shore A, still more typically from 0 to 20 Shore A, and even more typically from 0 to about 10 Shore A. In other embodiments, the hardness of the rubber carpet may be from 0 to about 50 Shore OO, more typically from 0 to about 40 Shore OO, still more typically from 0 to 30 Shore OO, and even more typically from 0 to about 20 Shore OO.

In certain embodiments, the hardness of the marine carpet may be from 0 to about 50 Shore A, more typically from 0 to about 30 Shore A, still more typically from 0 to 20 Shore A, and even more typically from 0 to about 10 Shore A, as measured according to ASTM D2240 type A scale. In other embodiments, the hardness of the marine carpet may be from 0 to about 50 Shore OO, more typically from 0 to about 40 Shore OO, still more typically from 0 to 30 Shore OO, and even more typically from 0 to about 20 Shore OO, as measured according to ASTM D2240 type OO scale.

In another embodiment of any of the above aspects, the body is formed from one or more metal and/or resin. In one embodiment, the metal is selected from stainless steel, aluminium, composite fibre reinforced metal, magnesium, and alloys thereof. In one embodiment, the resin is selected from acrylonitrile butadiene styrene (ABS), polypropylene (PP), and high-density polyethylene (HDPE).

In another embodiment of any of the above aspects, the body is formed from 100% virgin material, optionally without the addition of recycled material.

In another embodiment of any of the above aspects, the body is free from any material selected from polyurea, polyurethane and aliphatic/aromatic isocyanate monomers.

In certain embodiments, the body is free from elastomeric materials. In this embodiment, the body is a hard material having a Shore A of at least 40 as measured according to ASTM D2240 type A scale and is free from rubber-like or rubber-elastic properties. Typically, the body is free from foam or absorbent properties, and is non-porous.

In certain embodiments, the body has a Shore A durometer hardness of greater than 50 as measured according to ASTM D2240 type A scale. In other embodiments, the body has a Shore D durometer hardness of greater than 0, or greater than 10, or greater than 20, or greater than 30, or greater than 40, or greater than 50, or greater than 60, or greater than 70, or greater than 80, as measured according to ASTM D2240 type D scale.

In another embodiment of any of the above aspects, the body has a maximum thickness of about 1 mm, 2 mm or 3 mm. In other embodiments, the body has a maximum thickness of about 1 mm to 3 mm, about 2 mm to 3 mm, about 1 mm to 2 mm, or less than 1 mm.

In another embodiment of any of the above aspects, the body is formed from an extra high molecular weight hexene copolymer.

In another embodiment of any of the above aspects, the body comprises a bed. In one embodiment, the bed is defined by a top wall, a bottom wall, a right wall, and a left wall wherein each wall extends outwardly from the body and is joined to form a continuous wall. The continuous wall defines a recess for nesting the pressure absorbent material therein. In certain embodiments, the top wall, the bottom wall, the right wall, and the left wall may be integral to the body and may be formed by raising the walls from the base of the body or formed by pressing a die into the base of the body, during manufacture of the body.

In another embodiment of any of the above aspects, the body comprises at least one annular opening. The at least one annular opening may be positioned to align with existing mounts located in the cargo area or tailgate door.

In another embodiment of any of the above aspects, the body comprises one or more peripheral segment. In one embodiment, peripheral segment comprises a right segment and a left segment, wherein each segment comprises two annular openings.

In another embodiment of any of the above aspects, the annular openings penetrate through the area defined by the bed and the pressure absorbent material nested in the recess.

In another embodiment of any of the above aspects, the body comprises a lip. The lip may be substantially perpendicular or at a right angle relative to the body. In certain embodiments, the lip may be adjacent to the top wall of the bed and disposed substantially perpendicular relative to the body. The lip may protect a tailgate top surface from scruffs and damage when the tailgate protector is mounted on the tailgate door.

In another embodiment of any of the above aspects, the top wall comprises a set of channels along its length and running parallel to the side walls. The channels may assist in providing a gripping surface for handling the protector and may also assist in egress of fluids away from the pressure absorbent material when the tailgate protector is mounted on the tailgate door and the door is positioned in its open position.

In another embodiment of any of the above aspects, the body comprises a cushionable face (or pressure absorbent material mountable face) and a tailgate door mountable face on opposite faces of the body. In certain embodiments, the tailgate door mountable face may comprise an adhesive, preferably butyl tape, to securely bond the body to the tailgate door. In some embodiments, the adhesive is a strip of butyl tape positioned on at least one peripheral underside, preferably all four peripheral undersides of the tailgate door mountable face. When an adhesive, such as butyl tape, is present on the tailgate door mountable face, the body is completely even with the internal wall surface of the tailgate door and thereby prevents lifting, gaps or openings between the protector and the tailgate door. Preferably, the butyl tape is positioned on at least a top underside of the tailgate door mountable face to avoid front lifting.

In another embodiment of any of the above aspects, the pressure absorbent material is chemically attached to the body with one or more adhesive.

In another embodiment of any of the above aspects, the adhesive is one or more of strongly adhesive, odourless or has minimal odour, UV curable, colour fast, durable, chemical exposure resistant, water resistant, weather resistant or outdoor environment resistant, and stable under high temperature or has high heat resistance.

In another embodiment of any of the above aspects, the adhesive is selected from a thermoplastic elastomeric pressure-sensitive adhesive, or a high tack, water resistant, high heat resistant, synthetic rubber based permanent pressure sensitive hot melt adhesive. In another embodiment of any of the above aspects, the adhesive is one or more solvent-based acrylic pressure-sensitive adhesive comprising any one or more of 2-Ethylhexyl acrylate and ethyl acrylate.

In another embodiment of any of the above aspects, the adhesive is one or more rubber pressure-sensitive adhesive comprising one or more of polybutadiene, styrene-isoprene-styrene (SIS) block copolymers and styrene-butadiene-styrene (SBS) copolymers, optionally formulated with oils and tackifiers.

In another embodiment of any of the above aspects, the adhesive is one or more rubber pressure-sensitive adhesive or hot melt adhesive comprising block copolymers such as diblocks copolymers and triblock copolymers comprising styrenic copolymers. Styrenic block copolymers include, but are not limited to, styrene-isoprene-styrene (SIS) block copolymers, styrene ethylene/propylene styrene (SEPS) block copolymers, styrene ethylene/butylene styrene (SEBS) block copolymers, styrene ethylene/ethylene-propylene-styrene (SEEPS) block copolymers, and styrene-butadiene-styrene (SBS) block copolymers.

In another embodiment of any of the above aspects the adhesive has an adhesive strength that is sufficiently strong to avoid delamination. In some embodiments, the adhesive strength of the adhesive to bond the pressure absorbent material to the body is at least about 200 psi, or is at least about 400 psi, or is at least about 600 psi, or is at least about 800 psi, or at least about 1000 psi, or is at least about 1200 psi, or is at least about 1500 psi, or is at least about 1800 psi, or is at least about 2000 psi, or is at least about 2200 psi, or is at least about 2500 psi, or at least about 2800 psi, or at least about 3000 psi, or is at least about 3200 psi, or at least about 3500 psi, or is at least about 3800 psi, or at least about 4000 psi, as measured according to ASTM D4541.

In certain embodiments, the adhesive strength of the hot melt adhesive to bond the pressure absorbent material to the body is at least about 200 psi, or is at least about 400 psi, or is at least about 600 psi, or is at least about 800 psi, or is at least about 1000 psi, or is at least about 1200 psi, or is at least about 1500 psi, or is at least about 1800 psi, or is at least about 2000 psi, or is at least about 2200 psi, or is at least about 2500 psi, or at least about 2800 psi, or at least about 3000 psi, or is at least about 3200 psi, or at least about 3500 psi, or is at least about 3800 psi, or at least about 4000 psi, as measured according to ASTM D4541.

In other embodiments, the adhesive strength of the adhesive to bond the pressure absorbent material to the body is from about 200 to 4000 psi, or about 1000 to 4000 psi, or from about 1500 to 4000 psi, or from about 2000 to 4000 psi, or from about 2500 to 4000 psi, or from about 3000 to 4000 psi, or from about 1000 to 3500 psi, or from about 1500 to 3500 psi, or from about 2000 to 3500 psi, or from about 2500 to 3500 psi, or from about 3000 to 3500 psi, or from about 1000 to 3000 psi, or from about 1500 to 3000 psi, or from about 2000 to 3000 psi, or from about 2500 to 3000 psi, or from about 1000 to 2500 psi, or from about 1500 to 2500 psi, or from about 2000 to 2500 psi, or from about 1000 to 2000 psi, or from about 1500 to 2000 psi, as measured according to ASTM D4541.

In other embodiments, the adhesive strength of the hot melt adhesive to bond the pressure absorbent material to the body is from about 200 to 4000 psi, or about 1000 to 4000 psi, or from about 1500 to 4000 psi, or from about 2000 to 4000 psi, or from about 2500 to 4000 psi, or from about 3000 to 4000 psi, or from about 1000 to 3500 psi, or from about 1500 to 3500 psi, or from about 2000 to 3500 psi, or from about 2500 to 3500 psi, or from about 3000 to 3500 psi, or from about 1000 to 3000 psi, or from about 1500 to 3000 psi, or from about 2000 to 3000 psi, or from about 2500 to 3000 psi, or from about 1000 to 2500 psi, or from about 1500 to 2500 psi, or from about 2000 to 2500 psi, or from about 1000 to 2000 psi, or from about 1500 to 2000 psi, as measured according to ASTM D4541.

The adhesive strength of the adhesive may be measured by any known test method, for example, through standard peel testing protocols or ASTM D4541.

In another embodiment of any of the above aspects the hot melt adhesive has a viscosity range of about 1000 to 10000 cP at 180° C., typically about 4000 to 7000 cP, more typically about 6000 cp.

In another embodiment of any of the above aspects, the adhesive is blended with other polymers, oils and fillers, to modify the adhesive properties.

In another embodiment of any of the above aspects, the protector is adapted to be affixed or anchored to an existing mount, such as mounting brackets, mounting apertures, fixing holes and the like which may be located in a framework, in a cargo area or tailgate door of the vehicle.

In another embodiment of any of the above aspects, the body comprises a logo display area; optionally, the logo display area is rectangular in shape.

In another embodiment of any of the above aspects, the protector serves to prevent, or at least minimise damage of a wall surface of a cargo area or tailgate door.

In another embodiment of any of the above aspects, the protector is shaped and sized to fit within an interior floor surface of a cargo area, or an interior wall surface of a cargo area, or an interior wall surface of a tailgate door. In one embodiment, the body comprises a specifically designed recess wherein the pressure absorbent material is nested therein with an adhesive to provide a soft padded area to protect a user, such as a user's knee or leg, from injury or discomfort when kneeling or resting on the protector, or otherwise a user using the protector as a platform to access the cargo area of a vehicle.

In another embodiment of any of the above aspects, the protector may be a tailgate protector wherein the soft padded area protects a user, such as a user's knee or leg, from injury or discomfort when kneeling or resting on the tailgate protector, or otherwise using the protector as a platform to access the cargo area of a vehicle, for example, when a tailgate door comprising the tailgate protector is in an open position.

In another embodiment of any of the above aspects, the protector is designed and adapted to fit a tailgate door.

In another embodiment of any of the above aspects, the protector provides a padded area on the body to cushion a user. In one embodiment, the protector prevents damage to a rear tailgate of a vehicle. In another embodiment, the protector provides a non-slip safe padded area for loading and unloading cargo.

In another embodiment of any of the above aspects, the pressure absorbent material is a polyester non-woven fabric which has been chemically or thermally adhered to a specifically designed recess on the body. Preferably, the polyester non-woven fabric is rubber or marine carpet.

In another embodiment of any of the above aspects, the protector is adapted to be aligned and fastened to existing fixing holes located in a frame work of a vehicle's cargo area.

In another embodiment of any of the above aspects, the protector is designed to fit onto a tailgate door. In another particular embodiment, the protector is designed to fit onto a cargo bed floor surface.

In another embodiment of any of the above aspects, the body is formed from acrylonitrile butadiene styrene (ABS).

In another embodiment of any of the above aspects, the body is formed from an extra high molecular weight hexene copolymer, the pressure absorbent material is marine carpet, and the adhesive is a hot melt adhesive comprising CP Styrene.

In another embodiment of any of the above aspects, the body is formed from Marlex® HXM 50100, the pressure absorbent material is from the Orbit® carpet range, and the adhesive is Technomelt® PS 8214.

The above aspects and embodiments of this disclosure will now be described below with reference to the attached drawings.

BRIEF DESCRIPTION OF THE FIGURES

In order that the present invention may be readily understood and put into practical effect, reference will now be made to the accompanying illustrations, wherein like reference numerals refer to like features and wherein.

DETAILED DESCRIPTION OF THE INVENTION

Figure 1:
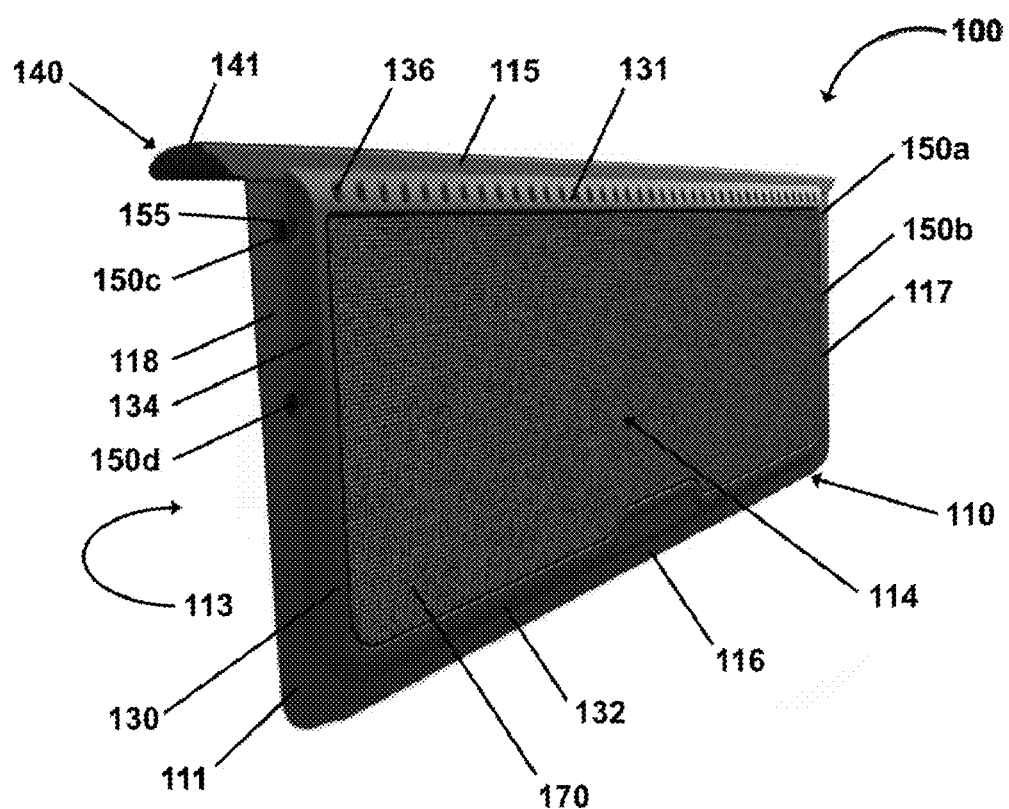
FIG. 1 is a perspective view of a tailgate protector according to one embodiment.

The following description refers to specific embodiments of the present disclosure and is in no way intended to limit the scope of the present disclosure to those specific embodiments.

The features shown in the figures are illustrative of some exemplary embodiments and are included to assist in explanation of embodiments embodying the principles of the invention.

Reference in the specification to "one embodiment", "another embodiment", "particular embodiments", or "certain embodiments" means that a particular feature, structure, characteristic, or function described in connection with the embodiment is comprised in at least one embodiment of the invention and may be in more than one embodiment. The appearances of the phrases "in one embodiment", "in some embodiments", or "in certain embodiments", etc in various places throughout the specification are not necessarily all referring to the same embodiment or embodiments.

Where the terms "comprise", "comprises", "comprised" or "comprising" are used in the specification, they are to be interpreted as specifying the presence of the stated features, integers, steps, components or groups referred to, but not to preclude the presence or addition of one or more other feature, integer, step, component or group thereof.

Further, any prior art reference or statement provided in the specification is not to be taken as an admission that such art constitutes, or is to be understood as constituting, part of the common general knowledge.

Also, the indefinite articles "a" and "an" preceding a feature or component embodying the principles of the invention are intended to be nonrestrictive regarding the number of instances (i.e., occurrences) of the feature or component. Therefore "a" or "an" should be read to comprise one or at least one, and the singular word form of the feature or component also comprises the plural unless the number is obviously meant to be singular.

As used herein, the term "vehicle" refers to any transport carrier for transporting people and/or goods from one location to another. In this context, a vehicle may refer to land vehicles such as a pickup truck, sport utility vehicle (SUV), station wagon, and other utilitarian land vehicles that have a cargo area.

As used herein, the term "tailgate door" refers to a vehicle door located at the rear of a vehicle for accessing a cargo area. A tailgate door opens downwards and is hinged at the floor of the cargo area.

As used herein, the term "hard polymeric material" means a level of solidity and rigidity of the polymeric material. The term is used to describe a material that is devoid of any cushioning ability.

As used herein, the term "soft" means a level of softness of the material. The term is used to describe a material that has a cushioning ability for comfort.

The hardness of the material may be determined by the Shore (Durometer) test, ASTM D2240. This test measures the resistance of a material to indentation by penetrating a durometer indenter into the material to provide an empirical hardness value. The Shore D scale is used to measure the hardness of "hard" materials. The Shore A scale is used to measure the hardness of "soft" materials. The Shore OO scale is used to measure the hardness of "very soft" materials.

As used herein, the term "cargo" means items requiring transportation such as pet, toolbox, tool, equipment, gear such as sport, fishing, camping and hunting gear, and the like and are not limited to these specifically.

Referring to FIG. 1, a tailgate protector 100 is shown comprising a body 110 and a pressure absorbent material 170. The pressure absorbent material 170 is attached to the body 110. The body 110 is sized and configured to mount onto a tailgate door wall surface 213 of a tailgate door 210. Wall surface 213 constitutes one of the walls surrounding the cargo area 310. The size and configuration of the body 110 is suitable to fit onto a tailgate door wall surface 213, such as a tailgate door 210 of a selected make and model vehicle 300. The protector 100 serves to prevent, or at least minimise damage of a tailgate door wall surface 213 due to contact with foreign materials during loading and unloading of cargo.

Body

In the embodiment shown in FIG. 1, the body 110 is a substantially planar rectangular sheet 111. The sheet 111 comprises a peripheral top segment 115, a peripheral bottom segment 116, a peripheral right segment 117, and a peripheral left segment 118. The peripheral segments 115, 116, 117, 118 may be elongated. The peripheral bottom segment 116, the peripheral right segment 117, and the peripheral left segment 118 all have substantially similar segment surface areas, whereas the peripheral top segment 115 is a substantially narrower segment compared with the other segments 116, 117, 118. Each segment in combination supports the structure of the body 110 and provides rigidity.

In the embodiment shown, at least one annular opening 150 is located within each segment surface area of respective elongated peripheral right segment 117 and the elongated peripheral left segment 118. In certain embodiments, at least one annular opening 150 may be located within each segment surface area of the peripheral segments 115, 116, 117, 1118. In other embodiments, opening 150 may be located at any position within peripheral segments 115, 116, 117 and 118.

FIG. 1 shows the elongated peripheral top segment 115 to be a substantially narrower elongated segment compared with the other segments 116, 117, 118. The narrower elongated segment 115 further comprises a lip 140. The lip 140 may be a substantially planar rectangular sheet 141. The lip 140 extends in a plane at an angle to the body 110. In the embodiment shown, the lip 140 is substantially perpendicular or at a right angle relative to the plane of the body 110.

The lip 140 is sized and configured to extend over a tailgate door wall surface 213, such as to cover a top surface 212 of a tailgate door 210. In embodiments where a lip 140 is present on the protector 100, the lip 140 protects the tailgate door top surface 212 from potential scratches and damage resulting from loading and unloading of cargo into or out of the cargo area 310 of the vehicle 300.

In certain embodiments, the body 110 does not include a lip 140 such as in situations where exposure of a tailgate door top surface 212 is selected, or in situations where protection of a tailgate door top surface 212 is not required.

In the embodiment shown in FIG. 1, the elongated peripheral right segment 117 and the elongated peripheral left segment 118 each comprises two annular openings 150. The right segment 117 comprises annular openings 150a, 150b and the left segment 118 comprises annular openings 150c, 150d. The annular openings 150 are located within each segment surface area of the elongated periphery segments 117 and 118.

Opening 150 may comprise an annular cavity 155 having an internal annular side wall 156. However, other alternative shapes of openings 150 may be selected, such as hexagonal, square, and the like having their respectively shaped side walls.

The body 110 has a mountable face 113 and a cushionable face 114. The cushionable face 114 is configured to attach a pressure absorbent material 170 to the body 110.

The cushionable face 114 comprises a bed 130. The bed 130 comprises a top wall 131, a bottom wall 132, a right wall 133 (not shown), and a left wall 134. The walls 131, 132, 133, 134 extend outwardly from the substantially planar sheet body 110. The walls 131, 132, 133, 134 define a recess 135 (not shown) for nesting the pressure absorbent material 170. The pressure absorbent material 170 may be secured in place with an adhesive 180 (not shown) or by a thermal process.

The recess 135 may be formed by pressing a die against the cushionable face 114 during manufacture of the body 110. In other embodiments, the recess 135 may be formed by embossing (or debossing) techniques during manufacture of the body 110.

The top wall 131 comprises a set of channels 136 along its length. Each channel 136 is positioned running parallel to the walls 133 and 134. The channels 136 may be used as a gripping surface to handle the body 110, for example, during operation of a tailgate door 210 between its open and closed positions.

The body 110 may be formed from any suitable material such as one or more metal and resin such as a hard polymeric material. Non-limiting examples of a suitable metal are stainless steel, aluminium, composite fibre reinforced metal, magnesium, and alloys thereof. Non-limiting examples of a suitable resin are acrylonitrile butadiene styrene (ABS), polypropylene (PP), and high-density polyethylene (HDPE). Other materials or combination of materials may be used as the body 110.

It has been observed that when the resin is acrylonitrile butadiene styrene (ABS), the surface finish does not suitably match with currently available bed liners. Trials with various adhesives demonstrated that ABS is the easiest to glue the pressure absorbent material 170 to the body 110. However, ABS is hygroscopic and scratches easily.

In certain embodiments, the body 110 may be formed from 100% virgin material. This ensures that the body 110 will display all characteristics of published engineering data from the resin supplier.

In certain embodiments, the body 110 may be formed from an extra high molecular weight hexene copolymer.

Preferably, the body 110 is formed from a resin providing at least one of good melt strength, good rigidity, good Environmental Stress Crack Resistance (ESCR), and good low temperature impact strength.

In one embodiment, the resin has a density range of about 0.8 to 1.1 g/cm$^3$, when measured according to ASTM D1355. In another embodiment, the resin has a flow rate range of about 5 g to 15 g/10 mins, when measured according to ASTM D1238. In another embodiment, the resin has a tensile strength at yield range of about 20 to 40 MPa, when measured according to ASTM D638. In another embodiment, the resin has an elongation at break of at least about 300%, when measured according to ASTM D638. In another embodiment, the resin has a flexural modulus range of about 1400 to 1700 MPa, when measured according to ASTM D790. In another embodiment, the resin has an ESCR range of about 500 to 800 h, when measured according to ASTM D1693. In another embodiment, the resin has a Shore D durometer hardness of about 50 to 80, when measured according to ASTM D2240. In another embodiment, the resin has a vicat softening temperature range of about 120 to 150° C., when measured according to ASTM D1525. In another embodiment, the resin has a heat deflection temperature range of about 70 to 90° C., when measured according to ASTM D648. In another embodiment, the resin has a brittleness temperature range of about −85 to −65° C., when measured according to ASTM D746. In another embodiment, the resin has a tensile impact range of about 170 to 200 kJ/m$^2$, when measured according to ASTM D1155.

In a particular embodiment, the resin has a density of at least about 0.948 g/cm$^3$, when measured according to ASTM D1355; a flow rate range of at least about 10.0 g/10 mins, when measured according to ASTM D1238; a tensile strength at yield of at least about 25 MPa, when measured according to ASTM D638; an elongation at break of at least about 300%, when measured according to ASTM D638; a flexural modulus of at least about 1500 MPa, when measured according to ASTM D790; an ESCR of at least greater than about 600 h, when measured according to ASTM D1693, a Shore D durometer hardness of at least about 68, when measured according to ASTM D2240; a vicat softening temperature of about 140° C., when measured according to ASTM D1525; a heat deflection temperature of about 78° C., when measured according to ASTM D648; a brittleness temperature of at least less than about −75° C., when measured according to ASTM D746; and a tensile impact of at least about 190 kJ/m$^2$, when measured according to ASTM D1155.

In a particular embodiment, the resin has a density of about 0.948 g/cm$^3$, when measured according to ASTM D1355; a flow rate range of about 12.0 g/10 mins, when measured according to ASTM D1238 (HLMI, 190° C./21.6 kg); a tensile strength at yield of at about 25 MPa, when measured according to ASTM D638 (2 in/min, Type IV bar); an elongation at break of about 750%, when measured according to ASTM D638 (2 in/min, Type IV bar); a flexural modulus of at least about 1200 MPa, when measured according to ASTM D790 (Tangent—16:1 span:depth, 0.5 in/min); an ESCR of greater than about 600 h, when measured according to ASTM D1693 (Condition B, 100% Igepal, $F_{50}$), a Shore D durometer hardness of about 66, when measured according to ASTM D2240 (Scale type D); a Vicat softening temperature of about 124° C., when measured according to ASTM D1525 (Loading 1, Rate A); a heat deflection temperature of about 69° C., when measured according to ASTM D648 (66 psi, Method A); a brittleness temperature of less than about −75° C., when measured according to ASTM D746 (Type A, Type I specimen); and a tensile impact of about 170 kJ/m$^2$, when measured according to ASTM D1155 (Type S bar).

In particular embodiments, the resin meets the specifications of (i) ASTM D4976-PE 235; (ii) FDA 21 CFR 177.1520(c) 3.2a, use conditions B to H; (ii) UL94HB yellow card per UL file E54300; (iii) NSF Standards 14 and 61 for potable water.

One suitable resin is Marlex® HXM 50100, a high-density polyethylene (HDPE), available from Chevron Phillips Chemical Company, The Woodlands, Tex., United States of America.

In certain embodiments, the resin may be injection moulded, blow-molded or thermoformed, to form the body 110 in a selected shape and configuration. In certain embodiments, the body 110 is one or more of durable, robust, scratch resistant, mouldable to various specific shapes, provides a levant surface finish, matches materials used in bed liner manufacture, waterproof, crack or break resistant, good melt strength, good rigidity, excellent ESCR, and excellent low temperature impact strength.

In certain embodiments, the body 110 may have a nominal length of about 1000 mm to 2000 mm and a nominal width of about 300 mm to 600 mm, for example, a body 110 for a tailgate door 210 may have a nominal length of about 1400 mm and a nominal width of about 470 mm. It would be understood that the length and width may vary depending on the tailgate door wall surface 213 selected.

Pressure Absorbent Material

The pressure absorbent material 170 may be a waterproof and/or weather resistant material. The protector 100 comprises a pressure absorbent material 170 to provide a cushioning effect and/or a non-slip surface. The pressure absorbent material 170 may be a cushion-like mass of fabric used for comfort and cushioning. In certain embodiments, the pressure absorbent material 170 may be a soft material such as foam, carpet, felt, synthetic fabrics, wool, and polymeric material such as vinyl, nylon, rubber, polyester, polyethylene, polypropylene and the like.

In certain embodiments, the pressure absorbent material 170 may be a polymeric material selected from bulked continuous filament nylon (BCF nylon), polyester, polyethylene, and polypropylene fabrics. In certain embodiments, the pressure absorbent material 170 may be a polyester non-woven fabric, preferably 100% polyester non-woven carpet.

In another embodiment, the pressure absorbent material 170 may be polypropylene non-woven fabric, preferably 100% polypropylene non-woven carpet.

In certain embodiments, the pressure absorbent material 170 may be rubber or marine carpet.

In certain embodiments, the pressure absorbent material 170 may have a velour, plush pile, ribbed pile, checkerboard or hobnail texture.

In certain embodiments, the pressure absorbent material 170 may have a latex backing.

In certain embodiments, the pressure absorbent material 170 may have a Shore A durometer hardness of less than 50, less than 45, less than 40, less than 35, less than 30, less than 25, less than 20, less than 15, less than 10, or less than 5, as measured according to ASTM D2240 type A scale. In other embodiments, the pressure absorbent material 170 may have a Shore A durometer hardness of from 0 to about 50, from 0 to about 45, from 0 to about 40, from 0 to about 35, from 0 to about 30, from 0 to about 25, from 0 to about 20, from 0 to about 15, from 0 to about 10, or from 0 to about 5, as measured according to ASTM D2240 type A scale.

In certain embodiments, the pressure absorbent material 170 may have a Shore OO durometer hardness of less than 85, less than 80, less than 75, less than 70, less than 65, less than 60, less than 55, less than 50, less than 45, less than 40, less than 35, less than 30, less than 25, less than 20, less than 15, less than 10, or less than 5, as measured according to ASTM D2240 type OO scale. In other embodiments, the pressure absorbent material 170 may have a Shore OO durometer hardness of from 0 to about 85, from 0 to about 80, from 0 to about 75, from 0 to about 70, from 0 to about 65, from 0 to about 60, from 0 to about 55, from 0 to about 50, from 0 to about 45, from 0 to about 40, from 0 to about 35, from 0 to about 30, from 0 to about 25, from 0 to about 20, from 0 to about 15, from 0 to about 10, or from 0 to about 5, as measured according to ASTM D2240 type OO scale.

A pressure absorbent material with a Shore A hardness of greater than 50, or Shore OO hardness of greater than 85, is too hard and incompressible, and does not provide a cushioning effect to adequately absorb a weight placed on a load-bearing surface of the pressure absorbent material.

It will be apparent to the skilled artisan that a material with a Shore A hardness of less than about 50, or a Shore OO hardness of less than about 80, may be employed as the pressure absorbent material. A pressure absorbent material with a lower Shore hardness value provides a cushioning property, whereas a pressure absorbent material with a higher Shore value, such as greater than about Shore A of 50 or a Shore OO of 80 provides a no suitable cushioning property. Accordingly, a pressure absorbent material with a lower Shore value may be selected when an improved cushioning effect is required to avoid discomfort and/or prevented from injury when a user places all, or a portion of the user's weight on the load-bearing surface of the pressure absorbent material.

In certain embodiments, the pressure absorbent material 170 may have a nominal mass per unit area/density range of about 300 g/m$^2$ to about 1550 g/m$^2$, 500 g/m$^2$ to about 1200 g/m$^2$, 800 g/m$^2$ to about 1200 g/m$^2$, or 1000 g/m$^2$ to about 1200 g/m$^2$. In some embodiments, the nominal mass per unit area/density is about 300 g/m$^2$, 350 g/m$^2$, about 400 g/m$^2$, about 500 g/m$^2$, about 550 g/m$^2$, about 600 g/m$^2$, about 650 g/m$^2$, about 700 g/m$^2$, about 750 g/m$^2$, about 800 g/m$^2$, about 850 g/m$^2$, about 900 g/m$^2$, about 950 g/m$^2$, about 1000 g/m$^2$, about 1050 g/m$^2$, about 1100 g/m$^2$, about 1150 g/m$^2$, about 1200 g/m$^2$, about 1250 g/m$^2$, about 1300 g/m$^2$, about 1350 g/m$^2$, about 1400 g/m$^2$, about 1450 g/m$^2$, about 1500 g/m$^2$, or about 1550 g/m$^2$.

In certain embodiments, the thickness of the pressure absorbent material 170 may range from about 1 mm to 20 mm, about 5 mm to about 20 mm, about 5 mm to about 10 mm, about 5 mm to about 15 mm, about 10 mm to about 15 mm, about 10 mm to about 20 mm, or about 15 mm to about 20 mm. In certain embodiments, the thickness of the pressure absorbent material 170 may be about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or about 20 mm.

In one embodiment, the pressure absorbent material 170 may be in a substantially rectangular shape. In certain embodiments, the pressure absorbent material 170 may have a nominal length of less than about 1000 mm to 2000 mm and a nominal width of less than about 300 mm to 600 mm, for example, a pressure absorbent material 170 for a tailgate door 210 may have a nominal length of less than about 1400 mm and a nominal width of less than about 470 mm. It would be understood that the length and width of the pressure absorbent material 170 may vary depending on the size of the body 110 selected.

In certain embodiments, the pressure absorbent material 170 may be a cut & loop pile.

In certain embodiments the pressure absorbent material 170 may be advantageously one or more of waterproof, durable, hard wearing, mildew resistant, insect resistant, stain resistant, UV stabilised, wet and dry environment safe, heat resistant, fray resistant, zipper resistant, colour fast, and low maintenance.

Particular embodiments include a pressure absorbent material 170 comprising 100% polypropylene fabric with a nominal mass per unit area/density of about 1500 g/m$^2$, and thickness of 10 mm. A suitable 100% polypropylene fabric is the Orbit® Kencord™, Kensquare™ and Starfire™ carpet range available from Melded Fabrics Pty Ltd (Australia). Another particular embodiment includes a pressure absorbent material 170 comprising 100% polyester fabric with a nominal mass per unit area/density of about 350 g/m$^2$ and thickness of 10 mm. A suitable 100% polyester fabric is the Interlude™ carpet range available from Melded Fabrics Pty Ltd (Australia).

The pressure absorbent material 170 may be sized and configured to suitably nest in the specific designated area of the recess 135 (not shown) on the body 110. A pre-configured pressure absorbent material 170 may be advantageous in situations where the body 110 is pre-configured and sized for assembly, in preparation for installation with a selected make and model vehicle 300.

Adhesive

In certain embodiments, the pressure absorbent material 170 may be advantageously attached to the body 110 with an adhesive 180 (not shown). In other embodiments, the pressure absorbent material 170 may be attached to the body 110 with a layer of adhesive 180 (not shown). Preferably, the pressure absorbent material 170 is strongly adhered to the body 110 with an adhesive 180. More preferably, the adhesive 180 may be one or more of strongly adhesive, odourless or has minimal odour, UV curable, colour fast, durable, chemical exposure resistant, water resistant, weather resistant or outdoor environment resistant, and stable under high temperature or has high heat resistance.

In certain embodiments, the adhesive 180 has an adhesive strength to bond the pressure absorbent material 170 to the body 110 of at least about 200 psi, or is at least about 400 psi, or is at least about 600 psi, or is at least about 800 psi, or is at least about 1000 psi, or is at least about 1200 psi, or is at least about 1500 psi, or is at least about 1800 psi, or is at least about 2000 psi, or is at least about 2200 psi, or is at least about 2500 psi, or at least about 2800 psi, or at least about 3000 psi, or is at least about 3200 psi, or at least about 3500 psi, or is at least about 3800 psi, or at least about 4000 psi.

In certain embodiments, the adhesive 180 has an adhesive strength to bond the pressure absorbent material 170 to the body 110 of from about 200 to 4000 psi, or from about 1000 to 4000 psi, or from about 1500 to 4000 psi, or from about 2000 to 4000 psi, or from about 2500 to 4000 psi, or from about 3000 to 4000 psi, or from about 1000 to 3500 psi, or from about 1500 to 3500 psi, or from about 2000 to 3500 psi, or from about 2500 to 3500 psi, or from about 3000 to 3500 psi, or from about 1000 to 3000 psi, or from about 1500 to 3000 psi, or from about 2000 to 3000 psi, or from about 2500 to 3000 psi, or from about 1000 to 2500 psi, or from about 1500 to 2500 psi, or from about 2000 to 2500 psi, or from about 1000 to 2000 psi, or from about 1500 to 2000 psi.

In certain embodiments, the adhesive 180 may be applied to the body 110 or pressure absorbent material 170 by using conventional hot melt application equipment, by extrusion, slot nozzle, roller or spray application including swirl spray. In particular embodiments, the adhesive application temperature may be from about 150 to about 180° C.

In one embodiment, the adhesive 180 may have a viscosity range of about 1000 to 10000 cP at 180° C. In other embodiments, the viscosity range is about 4000 to 7000 cP. In other embodiments, the viscosity range is about 6000 cp. In another embodiment, the adhesive 180 may have a softening point range of about 65 to about 180° C., using a Ring and Ball method. In another embodiment, the adhesive 180 may have a heat stability of up to 80 hours at 180° C. In a particular embodiment, the adhesive 180 may have a viscosity of about 6000 cP at 180° C. (350° F.), 100% solids, a softening point of about 110° C. using a Ring and Ball method, and a heat stability of 50 hours at 180° C.

In certain embodiments, the adhesive 180 may be a thermoplastic elastomeric pressure-sensitive adhesive (PSA), preferably a high tack, water resistant, high heat resistant, synthetic rubber based permanent pressure sensitive hot melt adhesive. In another embodiment, the adhesive 180 may be a solvent-based acrylic pressure-sensitive adhesive such as acrylic ester-based polymers comprising 2-Ethylhexyl acrylate (2-EHA) and ethyl acrylate (EA) based adhesives. In another embodiment, the adhesive 180 may be a rubber (liquid or hotmelt) pressure-sensitive adhesive such as polybutadiene, styrene-isoprene-styrene (SIS) block copolymers and styrene-butadiene-styrene (SBS) copolymers, formulated with oils and tackifiers. The formulated rubber pressure-sensitive adhesive may be produced by ionic copolymerization of SBS or SIS. In certain embodiments, the PSA may be blended with other polymers, oils and fillers, to modify its adhesive properties. In another embodiment, the adhesive 180 may be a hot melt adhesive comprising CP Styrene. In other embodiments, the hot melt adhesive 180 comprises polystyrene-isoprene copolymers, or polystyrene-butadiene copolymers. In other embodiments, the hot melt adhesive 180 comprises block copolymers such as diblocks copolymers and triblock copolymers comprising styrene. Styrenic block copolymers include, but are not limited to, styrene-isoprene-styrene (SIS) block copolymers, styrene ethylene/propylene styrene (SEPS) block copolymers, styrene ethylene/butylene styrene (SEBS) block copolymers, styrene ethylene/ethylene-propylene-styrene (SEEPS) block copolymers, and styrene-butadiene-styrene (SBS) block copolymers. One suitable adhesive is Technomelt® PS 8214 available from Henkel AG & Co. KGaA, Duesseldorf, Germany.

Figure 2:
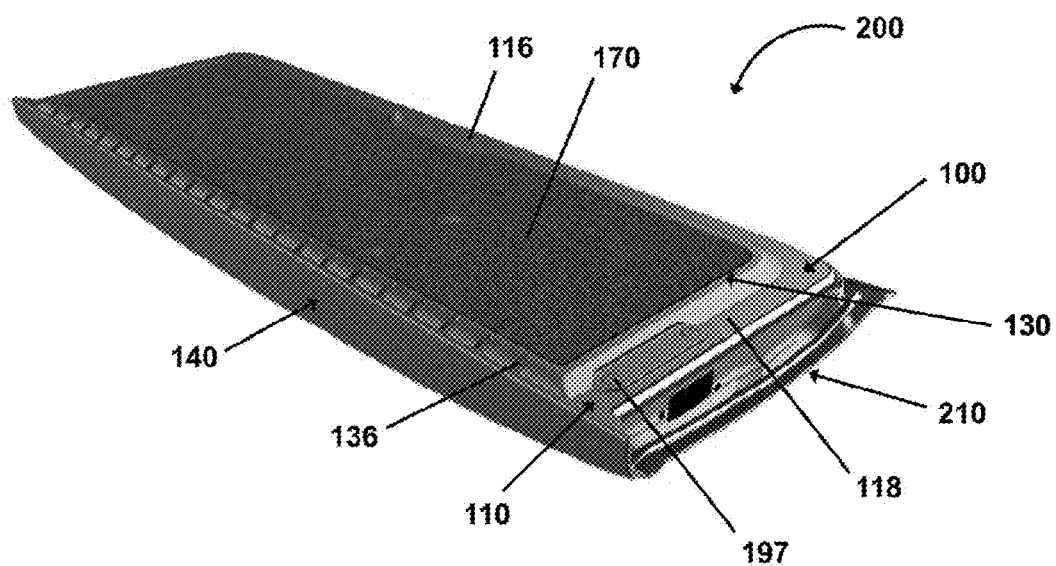
FIG. 2 is a perspective view of a tailgate assembly comprising a tailgate door and a tailgate protector affixed thereto according to another embodiment.

Referring to FIG. 2, a particular embodiment is shown of a tailgate assembly 200 comprising a tailgate door 210 and a protector 100 mounted thereon. The protector 100 is sized and configured to cover at least a portion of a tailgate door wall surface 213 to which it is affixed.

In the tailgate assembly 200 shown in FIG. 2, the annular openings 150*a* and 150*b* are located within the surface area of the elongated periphery right segment 117; whilst annular openings 150*c* and 150*d* are located within the surface area of the elongated periphery left segment 118. Additional annular openings 150*e*, 150*f*, 150*g* and 150*h* (not shown) penetrate through the substantially planar sheet body 110 and through the pressure absorbent material 170 secured in the recess 135 (not shown).

In certain embodiments, the openings 150 may be positioned such that they are in alignment with, and compatible with, the existing mounts 312 (not shown) of a tailgate door wall surface 213 such as existing mounts 312 on a tailgate door 210 of a selected vehicle 300. It would be understood by the skilled person that positions of mounts 312 on a tailgate door wall surface 213 may differ depending on the selected make and model vehicle 300.

Advantageously, having openings 150 in the body 110 configured to align with existing mounts 312 located on a wall surface 213 of a tailgate door 210 would be beneficial for ease of mounting and fastening the protector 100 to existing fixing holes or mounts designed into the steel work of the cargo area with fasteners 190 (not shown).

Fastener

The opening 150 may be configured to receive fastener 190 (not shown). Fastener 190 may be selected from any suitable mechanism known in the art such as a friction fit bolt, nut and bolt, screw, nail, peg, cement, glue and the like. In certain embodiments, the protector 100 may be readily detachable from the tailgate door 210 by using a readily removable fastener 190 that can be removed manually without using a tool. Examples of fastener 190 which may be removable without using a tool are friction fit bolts, pegs and the like. In other embodiments, the cargo area protector 100 may be permanently fixed to a tailgate door 210 by using a fastener 190 that cannot be removed without using a tool. Examples of fastener 190 which is difficult to remove without a tool are nut and bolt, screw, nail, cement, adhesive and the like.

In certain embodiments, fastener 190 (not shown) may be countersunk into the body 110. A countersunk fastener 190 may assist in providing an aesthetically pleasing continual appearance to the protector 100 and may additionally assist in preventing ingress or egress of foreign matter through the openings 150.

Plug

In certain embodiments, the protector 100 may comprise one or more plug 195 (not shown). Plug 195 is inserted into an opening 150 to cover fastener 190 and provide an aesthetically pleasing continual appearance to the protector 100. The plug 195 may comprise a plug body 196 (not shown) and a plug cap 197. The plug body 196 may be configured to engage the internal annular side wall 156 of annular cavity 155 with a friction or interference fit. The plug cap 197 may be configured to position substantially flat with entrance of the opening 150.

In some embodiments, it may be advantageous for the protector 100 to include a plurality of pockets 137 (not shown) configured for storing discretionary items, such as tools, emergency medical aids, stationary and the like.

In certain embodiments, the protector 100 may cover substantially all of a tailgate door wall surface 213 of a tailgate door 210. In other embodiments, the protector 100 may cover a portion of a tailgate door wall surface 213 of a tailgate door 210.

Figure 3:
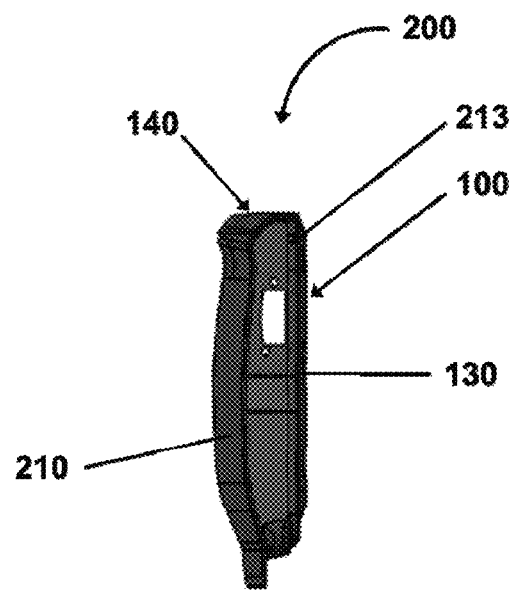
FIG. 3 is a side view of the tailgate assembly of FIG. 2.

Referring to FIG. 3, a side view of a tailgate assembly 200 is shown. The protector 100 is mounted and affixed to an existing mount 312 on tailgate door wall surface 213 of tailgate door 210 to form the tailgate assembly 200.

Figure 4:
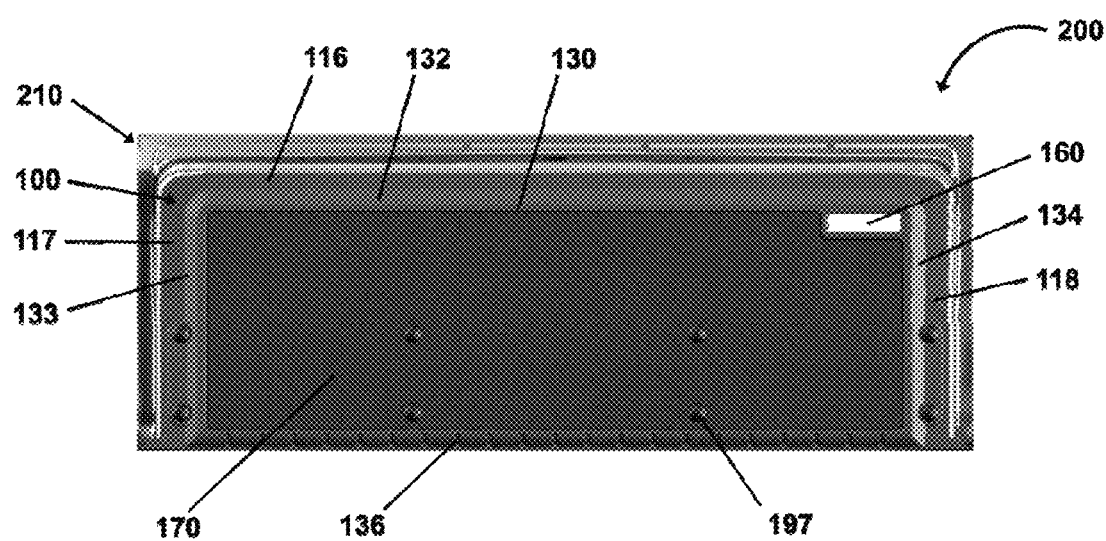
FIG. 4 is a front view of a tailgate assembly comprising a tailgate door and a tailgate protector affixed thereto according to another embodiment.

Referring to FIG. 4, another embodiment of a tailgate assembly 200 is shown. In this embodiment, the features are similar to those described with reference to FIGS. 1 to 3 above. The protector 100 in this embodiment comprises a logo display area 160. The logo display area 160 provides a surface to affix and display a proprietary trade brand or insignia such as the make and/or model of vehicle 300. The insignia may be a polymer coated decal such as a sticker, sewn on badge, transfer, and the like suitable to be positioned within the logo display area 160.

In certain embodiments, the logo display area 160 may be rectangular in shape, for example, having a nominal length of about 100 mm to about 140 mm and a nominal width of about 20 mm to about 40 mm. In particular embodiments, the logo display area 160 may be rectangular having a nominal length of about 120 mm and a nominal width of about 30 mm.

Figure 5:
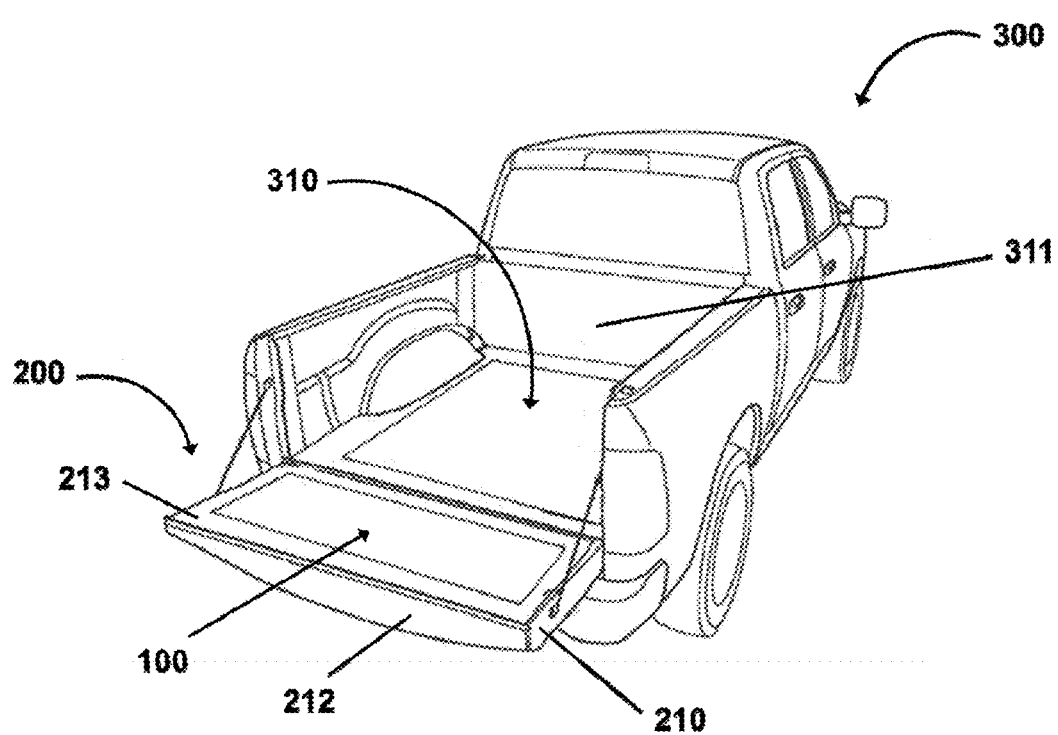
FIG. 5 is a perspective view of a vehicle comprising a tailgate assembly in its open position.

Referring to FIG. 5, another embodiment of a tailgate assembly 200 is shown. In this embodiment, the tailgate assembly 200 is installed at the rear of a vehicle 300. When the tailgate door 210 is upright in the closed position (not shown), its wall surface 213 assists in containing any cargo loaded into the cargo area 310. The tailgate assembly 200 as shown in FIG. 5 is positioned in an open position by pivoting the tailgate door 210 relative to the vehicle 300 such that a wall surface 213 of the tailgate door 210 is in a substantially horizontal position relative to the ground.

In some embodiments, when the tailgate assembly 200 is in an open position, the channels 136 may assist in capturing and diverting rain away from the pressure absorbent material 170 during wet weather conditions. In other embodiments when the tailgate assembly 200 is in an open position, the channels 136 may assist in diverting spilled fluid away from the pressure absorbent material 170.

In some embodiments, the protector 100 may be securely affixed to a tailgate door wall surface 213 of tailgate door 210 by a tailgate door hinge 214 (not shown), hingedly attached to cargo area 310 located at the rear of vehicle 300.

In certain embodiments, the pressure absorbent material 170 may be beneficial when a user requires a seat or at least a stable surface to place items thereon such as, mobile phones, laptops, tablets, drinks, food, schematics, tools, and the like. In other embodiments, the surface defined by the pressure absorbent material 170 may be used as a surface for writing or as a work surface. In other embodiments, the pressure absorbent material 170 may be used as a platform to access the cargo area 310, or otherwise as a platform to climb into or out of the cargo area 310. Generally, a tailgate assembly 200 may serve as a useful workbench, work station or a cushioned platform when the tailgate door 210 is in its open position.

Although the protector 100 of FIGS. 1 to 5 is shown as a single unit, it should be understood that the body 110 may include two or more units which when affixed to a wall surface 311 of cargo area 310, such as a tailgate door wall surface 213, functions similarly to a single unit.

EXAMPLES

Example 1

Pressure Absorbent Material Test No. 1
Sample Description: Non-woven fabric
Nominal composition—100% Polyester
Nominal mass: 350 g/m$^2$
Colour: Red

| AS 2001.4.3-1995 Colourfastness to rubbing | |
|---|---|
| | Staining |
| Dry | 3-4 |
| Wet | 4 |

| ISO 105-B02-1994 Colourfastness to light | |
|---|---|
| Lamp: Xenon ARC | |
| Method 1 | |
| Lightfastness rating | 6-17 |

Test terminated when blue wool standard 6 changed shade equivalent to 3 on the standard grey scale.
Tested on a water cooled Atlas C14000 Weatherometer at 63° C. black panel temperature and 50% relative humidity at 420 nm. Exposed with SDC standard blue scales.

Example 2

Pressure Absorbent Material Test No. 2
Mass/unit area: 1200 g/m$^2$
Pile fibre content: 100% Polypropylene
Construction details: Non-woven
Secondary backing/Style: Cut & Loop Pile
Colour: Charcoal/Grey Test method AS/ISO 9239.1 2003 Reaction to fire tests for flooring part 1 Determination of the burning behaviour using a radiant heat source as required by specification C1. 10a of the Building Code of Australia.

Tested in accordance with the Carpet Institute Code of Practice for AS/ISO 9239 Testing Version 10/0805.

The test values relate to the behaviour of the test specimens of a product under the particular conditions of the test, they are not intended to be the sole criterion for assessing the potential fire hazard of the product in use. Clause 9 of AS/ISO 9239 Part 1.

Conditioning as specified in BS EN 13238.2001
Assembly System: Direct Stick
The floor covering was directly stuck to the substrate using Roberts 95 Adhesive.
Substrate: Non-combustible
Substrate—6 mm Fibre reinforced cement board to simulate a non-combustible flooring.
The holding torque on the specimen frame was increased to 4 Nm.
Initial Test: Specimen 1 Length direction. Critical Radiant Flux 4.8 kW/m$^2$ Specimen 1 Width direction. Critical Radiant Flux 4.7 kW/m²
Full tests carried out in the width direction

TABLE 1

Fire Test Results

| Specimen | Width #1 | Width #2 | Width #3 | Width #4 |
|---|---|---|---|---|
| Critical Radiant Flux (kW/m²) | 4.7 | 5.1 | 5.6 | 5.1 |
| Smoke Development Rate (% · min) | 247 | 268 | 220 | 245 |

The values quoted below area as required by Specification C1.10a Fire Hazare Properties (Floors) of the Building Code of Australia.

The Critical Radiant Flux quoted is the value at Flame-Out/Extinguishment (BCA General Provisions A1.1).

Mean Critical Radiant Flux 5.1 kW/m²

Mean Smoke Development Rate 245 Percent-Minutes

Observations due to the specimens tendency to shrink away from the edges of the frame the holding torque was increased as shown plus the edges of the samples were stapled to the substrate at 50 mm centres.

TABLE 2

Time for each specimen to reach each marker in seconds

| Specimen | 50 | 60 | 110 | 160 | 210 | 260 | 310 | 360 | 410 |
|---|---|---|---|---|---|---|---|---|---|
| 1 | 180 | 182 | 200 | 245 | 455 | 651 | 1043 | 650 | 1765 |
| 2 | 164 | 166 | 227 | 265 | 382 | 420 | 644 | 1083 | — |
| 3 | 186 | 188 | 211 | 280 | 445 | 524 | 702 | 1893 | — |

TABLE 3

Fire Test Results

| Tests Specimen | Smoke Production | | Burning Characteristics | |
|---|---|---|---|---|
| | Maximum Light Attenuation (%) | Smoke Development Rate (% · min) | Burn Length (mm) at Flame Out/ Extinguishment | Time to Burn Out (s) |
| Initial Test Length Specimen Tests: Width | 24 | 239 | 437 | 3094 |
| 1 | 18 | 247 | 440 | 3154 |
| 2 | 50 | 268 | 420 | 1899 |
| 3 | 49 | 220 | 390 | 2623 |
| Mean | 39 | 245 | 417 | 2559 |

Example 3

Sample Description: Non woven pile carpet
Colour: Charcoal
Nominal Composition: 100% Polyester
Nominal Mass per unit Area/Density: 1.2 kg/m²
Nominal Thickness: 10 mm
Test Description
Methods for Fire Tests on building materials, components and structure part 3: Simultaneous determination of ignitability, flame propagation, heat release and smoke release (Method: AS/NZS 1530.3-1999)
Surface Tested: Face
No. of specimen ignited: 6
No. of specimen tested: 6

TABLE 4

AS/NZS 1530.3-1999 Test Results
Test results

| | Standard Error | Mean |
|---|---|---|
| Ignition time | 0.29 | 5.73 min |
| Flame propagation time | Nil | Nil |
| Heat release integral | 2.5 | 58.2 kJ/m² |
| Smoke release, log d | 0.0582 | −0.9863 |
| Optical density | — | 0.1079/meter |

TABLE 5

Regulatory Indicies
Regulatory Indicies

| | Value | Range |
|---|---|---|
| Ignitability index | 10 | 0-20 |
| Spread of flame index | 0 | 0-10 |
| Heat evolved index | 2 | 0-10 |
| Smoke developed index | 4 | 0-10 |

The specimens melted away from the area of maximum heat and produced droplets during the test. Due to this phenomena it should be recognised that this test result may not be a true indication of the carpet's fire hazard properties.

Each test specimen had an unattached backing of 4.5 mm thick fibre reinforced cement board.

Each test specimen was restrained on the exposed face by a layer of galvanised welded square mesh made from wire of nominal diameter 0.8 mm and nominal spacing 12 mm in both directions and securely fixed to a backing board at four points each 100 mm from the centre of the sample and the assembly clamped in four places.

To allow free movement of sample during testing all corners were folded away from the clamps. These results only apply to the specimen mounted, as described above. The result of this fire test may be used to directly assess fire hazard, but it should be recognised that this test method will not provide a full assessment of fire hazard under all fire conditions.

Example 4: Accelerated Environmental Testing

Adhesive: Technomelt PS8214
Humidity Chamber: Thermoline Scientific—model #TRH-850-SD
High Temperature Oven
Environmental testing conditions: 38° C. and 95% relative humidity, 14 consecutive days (automotive standard)
Heat stability testing conditions: 60° C., 5 consecutive days
The laboratory conditions during testing period: average temperature of about 20° C. (21° C.±2° C.) and average relative humidity of about 40% (40%±10%).
Sample 1:
Pressure Absorbent Material: Carpet Liner
Body: Plastic
Adhesive: Technomelt PS 8214
Bonding and Cure Method of Sample 1: The pressure absorbent material had been bonded to the plastic body by partially covering a non-facing side of the pressure absorbent material with the adhesive using a 3-step process and cured over 7 days at room temperature.

Sample 2:
Pressure Absorbent Material: Carpet Liner
Body: Plastic
Adhesive: Technomelt PS 8214

Bonding and Cure Method of Sample 2: The pressure absorbent material had been bonded to the plastic body by fully covering a non-facing side of the pressure absorbent material with the adhesive using a 1-step process and cured over 7 days at room temperature.

Test Condition 1: 14 days at 38° C. and 95% relative humidity

Test Condition 2: 5 days at 60° C.

Test Method 1
Each sample was placed in a humidity chamber at the specified humidity and temperature for 14 days. After 14 days, the sample was removed from the humidity chamber and allowed to rest for a period of 24 hours. Each sample was then observed for any physical changes and odour.

Adhesive strength integrity and delamination was tested by pulling, for at least 5 seconds, the carpet liner away from the plastic body by hand using human strength (average/standard human strength). Two peel tests were conducted with the tailgate protector laid in two orientations: (1) the tailgate protector in a vertical position; and (2) the tailgate protector in a horizontal position.

Test Method 2
Each sample was placed in a dry oven at the specified temperature for 5 days. After 5 days, the sample was removed from the oven. Each sample was then observed for any physical changes and odour.
Adhesive strength integrity and delamination was tested by pulling, for at least 5 seconds, the carpet liner away from the plastic body by hand using human strength (average/standard human strength). Two peel tests were conducted with the tailgate protector laid in two orientations: (1) the tailgate protector in a vertical position; and (2) the tailgate protector in a horizontal position.

Results

The accelerated environmental testing results demonstrate that the cargo area/tailgate protector has high reliability and long service life.

Both Samples 1 and 2 did not delaminate or showed signs of reduced bond strength after 14 days of high humidity at 38° C. in a humidity chamber. The adhesive used in Sample 1 maintained a strong bond strength and maintained the bonding between the pressure absorbent carpet liner and the plastic body even after being subjected to the above environmental testing conditions. Similarly, the adhesive used in Sample 2, which had a lower adhesive coating weight applied, maintained a strong bond strength and maintained the bonding between the pressure absorbent carpet liner and the plastic body even after being subjected to the above environmental testing conditions (Test Condition 1).

Furthermore, both Samples 1 and 2 did not delaminate or showed signs of reduced bond strength even after being further subjected to the heat stability testing conditions at an elevated temperature of 60° C. for 5 days in a dry oven (Test Condition 2). No softening of the adhesive in the Samples was observed after this testing period. Additionally, no odour was observed from the samples after this testing period.

These tests demonstrate that the adhesive does not degrade even after 19 days of continuous accelerated environmental exposure. Each test sample maintained its structural form and no failure, or de-lamination of the carpet liner from the plastic body, was observed. The data obtained under these simulated conditions show the pressure absorbent material is suitably adhesively attached to the body of the cargo area/tailgate protector and does not delaminate.

Other embodiments and uses embodying the principles of the invention will be apparent to those having ordinary skill in the art upon consideration of the specification and figures herein. The specification and specific examples given should be considered exemplary only, and it is contemplated that the appended claims will cover any other such embodiments or modifications that fall within the scope of the invention disclosed herein.

TABLE 6

Accelerated Environmental Testing Results

| Sample | Test Method | Adhesive | Substrate | Bonding and Cure Method | Test Condition | Result |
|---|---|---|---|---|---|---|
| 1 | 1 | Technomelt PS 8214 | Carpet liner/Plastic | Partial coverage and press/3 step process + 7 days cure at RT | 14 days at 38 C. and 95% RH in a humidity chamber | No failure |
| 1 | 1 | Technomelt PS 8214 | Carpet liner/Plastic | Partial coverage and press/3 step process + 7 days cure at RT | Further 5 days at 60 C. in dry oven | No failure |
| 2 | 2 | Technomelt PS 8214 | Carpet liner/Plastic | Full coverage/1 step process + 7 days cure at RT | 14 days at 38 C. and 95% RH in a humidity chamber | No failure No delamination |
| 2 | 2 | Technomelt PS 8214 | Carpet liner/Plastic | Full coverage/1 step process + 7 days cure at RT | Further 5 days at 60 C. in dry oven | No failure No delamination |

The invention claimed is:

1. A tailgate protector for a vehicle, wherein the protector comprises an external facing pressure absorbent material which has been attached to a body of the protector with an adhesive, wherein the external facing pressure absorbent material consists of fabric and provides a soft padded area for protecting a user from injury or discomfort, and the adhesive is a pressure sensitive adhesive comprising styrene, and the body is formed from a resin, and wherein the pressure absorbent material has (i) a Shore A hardness of less than 50 as measured according to ASTM D2240 type A scale; or (ii) a Shore OO hardness of less than 85 as measured according to ASTM D2240 type OO scale, and wherein the body has a Shore A hardness of at least 40 as measured according to ASTM D2240 type A scale and is free from elastomeric materials.

2. The protector of claim 1, wherein the pressure sensitive adhesive is a thermoplastic elastomeric pressure-sensitive adhesive having a viscosity in the range of 1,000 to 10,000 cP at 180° C., a softening point of 65 to 180° C. when measured using a ring and ball method, a heat stability of up to 80 hours at 180° C. and an adhesive strength to bond the pressure absorbent material to the body of 200 psi to 4000 psi.

3. The protector of claim 2, wherein the pressure sensitive adhesive is one or more of styrene-isoprene-styrene (SIS) block copolymers and styrene-butadiene-styrene (SBS) block copolymers.

4. The protector of claim 2, wherein the pressure sensitive adhesive comprises polystyrene-isoprene copolymers or polystyrene-butadiene copolymers, or styrenic block polymers including styrene-isoprene-styrene (SIS) block copolymers, styrene ethylene/propylene styrene (SEPS) block copolymers, styrene ethylene/butylene styrene (SEBS) block copolymers, styrene ethylene/ethylene-propylene-styrene (SEEPS) block copolymers, and styrene-butadiene-styrene (SBS) block copolymers.

5. The protector of claim 1, wherein the pressure absorbent material is selected from a polyester non-woven fabric and polypropylene non-woven fabric, optionally 100% polyester non-woven carpet or 100% polypropylene non-woven carpet.

6. The protector of claim 1, wherein the pressure absorbent material is marine carpet.

7. The protector of claim 1, wherein the resin is selected from acrylonitrile butadiene styrene (ABS), polypropylene (PP), and high-density polyethylene (HDPE).

8. The protector of claim 1, wherein the body comprises a lip.

9. The protector of claim 1, wherein the body comprises a bed for nesting the pressure absorbent material therein.

10. The protector of claim 1, wherein the body is formed from HDPE, the pressure absorbent material is marine carpet, and the adhesive is a hot melt adhesive comprising styrene.

11. A tailgate assembly comprising a tailgate door and a tailgate protector according to claim 1 affixed to the tailgate door.

12. A tailgate protector for a vehicle, wherein the protector comprises a pressure absorbent material which has been attached to a body of the protector with an adhesive, wherein the material having pressure absorbent material is fabric and provides a soft padded area for protecting a user from injury or discomfort, and the adhesive is a pressure sensitive adhesive comprising styrene, and wherein the body is formed from HDPE, having a Shore D durometer hardness of greater than 60 as measured according to ASTM D2240 type D scale, a density of at least 0.948 g/cm$^3$ when measured according to ASTM D1355, a flow rate of at least 10.0 g/10 mins when measured according to ASTM D1238, a tensile strength at yield of at least 25 MPa when measured according to ASTM D638, an elongation at break of at least 700% when measured according to ASTM D638, a flexural modulus of at least 1,200 MPa when measured according to ASTM D790, an environmental stress cracking resistance (ESCR) of at least greater than 1,000 h when measured according to ASTM D1693, a Vicat softening temperature of 126° C. when measured according to ASTM D1525, a heat deflection temperature of 78° C. when measured according to ASTM D648, a brittleness temperature of at least less than −75° C. when measured according to ASTMD746 and a tensile impact strength of at least 190 kJ/m$^2$ when measured according to ASTM D1822, and wherein the pressure absorbent material has (i) a Shore A hardness of less than 50 as measured according to ASTM D2240 type A scale; or (ii) a Shore OO hardness of less than 85 as measured according to ASTM D2240 type OO scale.

13. A protector for a tailgate of a vehicle, the protector comprising,
a resin body adapted to be affixed to a wall of the tailgate, wherein the resin body is formed from HDPE, having a Shore D durometer hardness of greater than 60 as measured according to ASTM D2240 type D scale, a density of at least 0.948 g/cm$^3$ when measured according to ASTM D1355, a flow rate of at least 10.0 g/10 mins when measured according to ASTM D1238, a tensile strength at yield of at least 25 MPa when measured according to ASTM D638, an elongation at break of at least 300% when measured according to ASTM D638, a flexural modulus of at least 1,200 MPa when measured according to ASTM D790 (Tangent-16:1 span:depth, 0.5 in/min), a vicat softening temperature of 120 to 150° C. when measured according to ASTM D1525, a heat deflection temperature of 78° C. when measured according to ASTM D648, a brittleness temperature of at least less than −75° C. when measured according to ASTM D746 and a tensile impact strength of at least 190 kJ/m$^2$ when measured according to ASTM D1822;
a pressure absorbent material having a facing side and a non-facing side, wherein the facing side is a load-bearing surface comprising fabric, the load bearing surface providing a soft padded area for protecting a user from injury or discomfort,
a pressure sensitive adhesive comprising styrene and attaching the pressure absorbent material to the resin body,
and wherein the fabric has (i) a Shore A hardness of less than 50 as measured according to ASTM D2240 type A scale; or (ii) a Shore OO hardness of less than 85 as measured according to ASTM D2240 type OO scale.

14. A protector for a tailgate of a vehicle, the protector comprising;
a resin body adapted to be affixed to a wall of the tailgate,
an external facing pressure absorbent material, wherein the external facing pressure absorbent material is a load-bearing surface consisting of fabric, the load bearing surface providing a soft padded area for protecting a user from injury or discomfort,
a pressure sensitive adhesive comprising styrene and attaching the pressure absorbent material to the resin body,
and wherein the pressure absorbent material has (i) a Shore A hardness of less than 50 as measured according to ASTM D2240 type A scale; or (ii) a Shore OO hardness of less than 85 as measured according to ASTM D2240 type OO scale, and wherein the body has a Shore A hardness of at least 40 as measured according to ASTM D2240 type A scale and is free from elastomeric materials.

15. The protector of claim 14, wherein the adhesive has a viscosity of 1000 to 10,000 cP, a softening point of at least 110° C. when measured using the ring and ball method and a heat stability of up to 80 hours at 180° C.

16. The protector of claim 14, wherein the resin body comprises:
 a mountable face adapted to be affixed to an internal wall of a tailgate,
 a face comprising a recess for receiving the pressure absorbent material and pressure sensitive adhesive, and optionally,
 an elongate peripheral top segment having a lip.

17. A tailgate protector for a vehicle, wherein the protector comprises an external facing pressure absorbent material which has been attached to a body of the protector with an adhesive, wherein the external facing pressure absorbent material consists of marine carpet and provides a soft padded area for protecting a user from injury or discomfort, and the adhesive is a pressure sensitive adhesive comprising styrene, and the body is formed from a resin, and wherein the body has a Shore A hardness of at least 40 as measured according to ASTM D2240 type A scale and is free from elastomeric materials.

18. The protector of claim 17, wherein the marine carpet is selected from a polyester non-woven carpet and polypropylene non-woven carpet.

19. The protector of claim 17, wherein the resin is selected from acrylonitrile butadiene styrene (ABS), polypropylene (PP), and high-density polyethylene (HDPE).

* * * * *